(12) United States Patent
Hunter

(10) Patent No.: US 10,130,082 B2
(45) Date of Patent: Nov. 20, 2018

(54) ANGLER KIT AND METHOD FOR PERSONALIZED HAND PRODUCTION OF FISHING LURES

(71) Applicant: Richard Eugene Hunter, New Albany, OH (US)

(72) Inventor: Richard Eugene Hunter, New Albany, OH (US)

( * ) Notice: Subject to any disclaimer, the term of this patent is extended or adjusted under 35 U.S.C. 154(b) by 584 days.

(21) Appl. No.: 14/980,625

(22) Filed: Dec. 28, 2015

(65) Prior Publication Data

US 2017/0181416 A1   Jun. 29, 2017

(51) Int. Cl.
*A01K 85/02* (2006.01)
*A01K 97/00* (2006.01)

(52) U.S. Cl.
CPC .............. *A01K 85/02* (2013.01); *A01K 97/00* (2013.01)

(58) Field of Classification Search
CPC ....................................................... A01K 85/02
USPC ........................................................ 43/42.28
See application file for complete search history.

(56) References Cited

U.S. PATENT DOCUMENTS

| | | | | |
|---|---|---|---|---|
| 1,654,830 A * | 1/1928 | Pflueger | ................. | A01K 85/00 43/42.28 |
| 3,343,296 A * | 9/1967 | Davis | ..................... | A01K 85/00 43/42.17 |
| 3,500,573 A * | 3/1970 | Hudson | .................. | A01K 85/00 43/42.11 |
| 3,579,892 A * | 5/1971 | Olvey, Sr. | .............. | A01K 85/00 43/42.11 |
| 3,590,514 A * | 7/1971 | Begley | .................... | A01K 85/00 43/42.28 |
| 4,074,454 A * | 2/1978 | Cordell, Jr. | ............ | A01K 85/00 43/42.28 |
| 4,329,804 A * | 5/1982 | Brown | .................... | A01K 85/00 43/42.09 |
| 4,638,586 A * | 1/1987 | Hall | ........................ | A01K 85/00 43/42.13 |
| 4,790,101 A * | 12/1988 | Craddock | ............. | A01K 85/02 43/42.24 |
| 4,850,131 A | 7/1989 | Standish, Jr. | | |
| 4,914,851 A * | 4/1990 | Acker | .................... | A01K 85/02 43/42.05 |
| 5,007,193 A | 4/1991 | Goodley et al. | | |
| 5,117,573 A * | 6/1992 | Semler | ................... | A01K 85/00 43/42.09 |
| 5,630,289 A | 5/1997 | Dotson | | |
| D384,726 S | 7/1997 | Gregory | | |
| 5,709,047 A * | 1/1998 | Link | ....................... | A01K 85/00 43/42.28 |
| 5,899,015 A * | 5/1999 | Link | ...................... | A01K 85/00 43/42.28 |
| 5,974,723 A * | 11/1999 | Taibi | ...................... | A01K 85/02 43/42.11 |
| 6,058,643 A | 5/2000 | Marusak et al. | | |

(Continued)

FOREIGN PATENT DOCUMENTS

WO        WO-9814057 A1 *   4/1998   ............. A01K 85/00

*Primary Examiner* — Christopher P Ellis
(74) *Attorney, Agent, or Firm* — Bradford E. Kile; Kile Park Reed & Houtteman PLLC

(57) ABSTRACT

An angler's personalized fishing lure skirt composition and production kit and a method for personalized production of fishing lure skirts, including angler personalized fishing lure skirts having body tendrils and a combination of body tendrils and elongated, fishing lure tail tendrils.

20 Claims, 10 Drawing Sheets

(56) References Cited

U.S. PATENT DOCUMENTS

| | | | |
|---|---|---|---|
| 6,105,304 A | 8/2000 | Wicklund | |
| 6,199,312 B1 * | 3/2001 | Link | A01K 85/01 43/42.24 |
| 6,233,863 B1 | 5/2001 | Dotson | |
| 6,272,787 B1 * | 8/2001 | Link | A01K 85/00 427/256 |
| 6,418,659 B1 | 7/2002 | Shelton | |
| 6,598,336 B2 * | 7/2003 | Link | A01K 85/00 43/42.24 |
| 7,891,067 B2 | 2/2011 | Muhlenbruck | |
| 8,192,839 B2 | 6/2012 | Greene et al. | |
| 8,484,884 B2 | 7/2013 | Zuk | |
| 8,793,925 B2 * | 8/2014 | Rossi | A01K 83/00 43/42.25 |
| 8,869,446 B2 * | 10/2014 | Parks | A01K 85/02 43/42.28 |
| 2009/0172993 A1 * | 7/2009 | Willis | A01K 85/00 43/42.28 |
| 2011/0239522 A1 * | 10/2011 | Renosky | A01K 85/00 43/42.28 |
| 2017/0347635 A1 * | 12/2017 | Sandefur | A01K 85/02 |

* cited by examiner

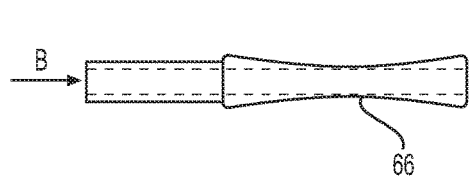
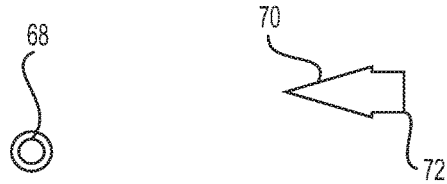
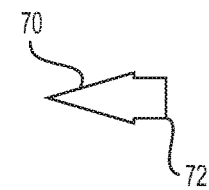
*FIG. 3N*  *FIG. 3O*  *FIG. 3P*
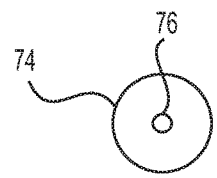
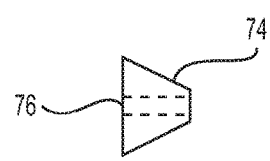
*FIG. 3R*  *FIG. 3Q*
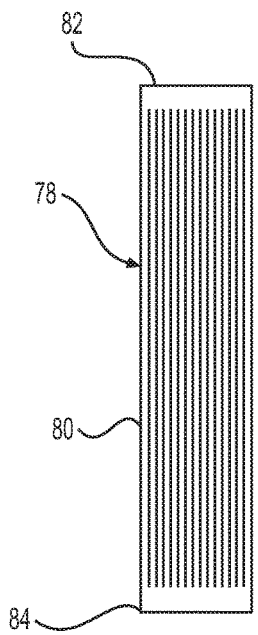
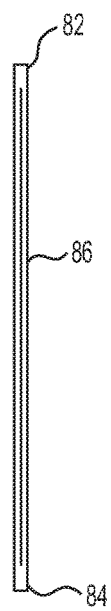
*FIG. 3S*  *FIG. 3T*

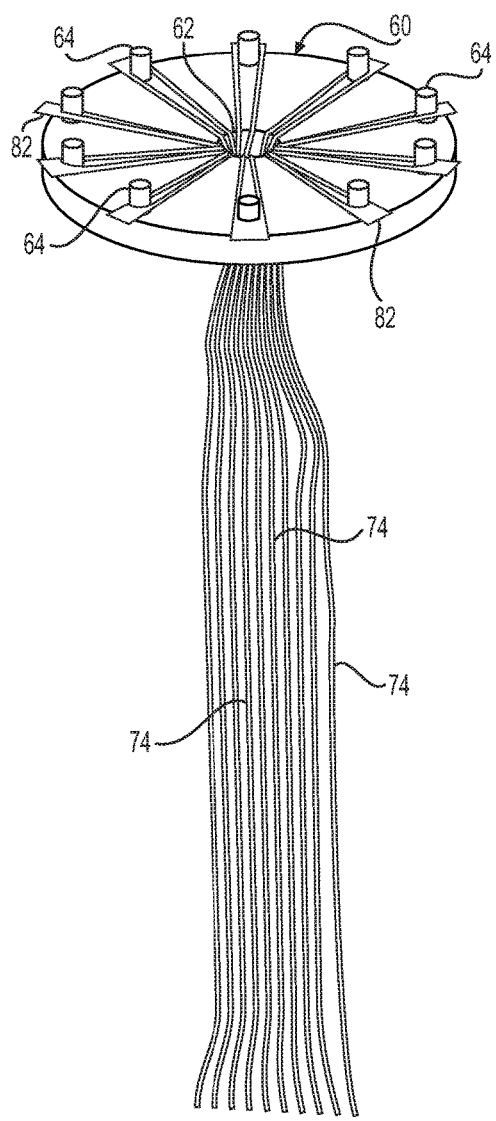 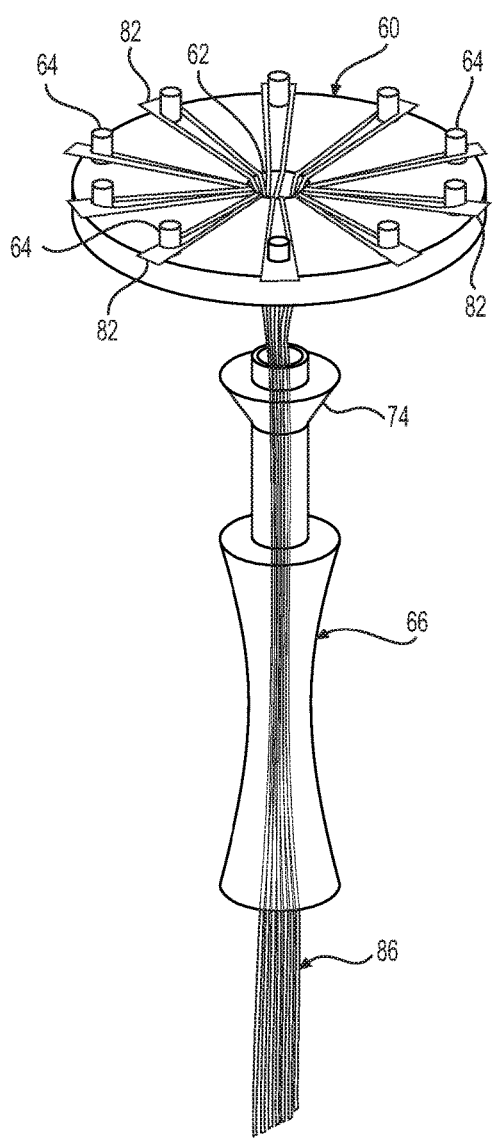 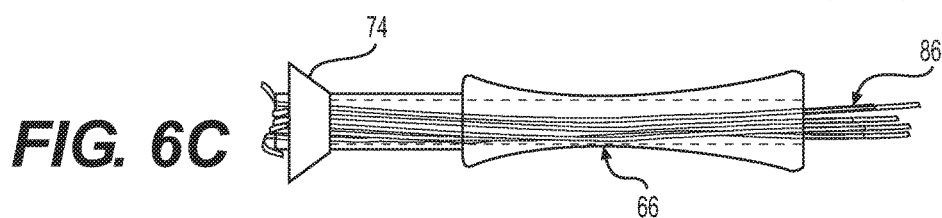
*FIG. 6A*  *FIG. 6B*  *FIG. 6C*

ANGLER KIT AND METHOD FOR PERSONALIZED HAND PRODUCTION OF FISHING LURES

BACKGROUND OF THE DISCLOSURE

This invention relates to an angler's kit and method of producing personalized fishing lures. More specifically, this invention relates to a kit and method to enable an angler to use his/her personal perceptions, experience and intuition to produce a variety of fishing lures with body tendrils or body and tail tendrils designed to optimize the angler's personal fishing experience. The invention is directed to addressing an angler's preferences in terms of color, reflectivity, glitter, texture, density, flexibility, patterns, etc. of fishing lures with skirts which in an individual angler's opinion will be most suitable for a specific environment out of a universe of envisioned fishing conditions. Variable conditions include; but are not limited to, sunlight, shadows, water color and/or clarity, seasonal conditions that affect fish activity, functional activity of a lure in the water, and other considerations that in an angler's personal opinion will optimize the angler's fishing experience. Although the subject invention has worthwhile application when angling for various fish varieties, such as , for example, northern pike and muskie, it is envisioned that the subject invention is particularly useful to enhance an angler's fishing experience for black bass.

The most common lures for bass fishing are plugs, plastics and wire baits. Plugs are mostly made of hard plastic and include hollow components. They are typically shaped like bait fish with double or treble hooks hanging from the lure belly. Some dive and others stay on the surface of the water and when reeled in jerk or wiggle. The variations available for such lures are virtually endless through personalized preference for color, size, and type of wiggle. For plastics, the lure bodies are typically composed from a soft rubbery composition of pliable plastic. A hook is inserted into the plastic and a sinker (lead weight) can be used to vertically orient the lure in water. Depending on where an angler positions a hook and sinker and how the angler positions the plastic with respect to the hook(s) will effectively create a distinctive type of rig. Some previously known popular rigs are known as: a Texas rig, a drop shot rig, a Carolina rig, and a wacky rig, to name a few. Plastic body components are also shaped in the configuration of worms, frogs, lizards, crayfish, small fish, and every kind of aquatic creature that lives in freshwater that is a natural food for bass.

In addition to lures as noted above, bass fisherman often prefer wire baits made from a combination of a small fish head and slender body distal to the head segment that usually terminates in a single bass hook—although multiple hooks are also well known. A wire bait is often enhanced with a parallel spinner of various designs such as single or double Colorado spinners, double willow or tandem designs that spin or vibrate to attract fish to a lure. Spinner designs have been created to affect the depth of action of a lure, how smoothly the lure pulls through the water, and in certain designs creating a degree of noise to attract fish. Wire baits consist of buzzbaits (a bait that runs on the top of the water and makes a splashy wake), Chatterbaits®, (a bait that runs under the water and wiggles), and spinnerbait (that has rotating blade action in the water).

In addition to a bait fish head, spinner and bait fish body with a single hook, a wire bait is usually fitted with a skirt body and often an elongated skirt tail of fine silicone tendrils that cover a hook or hook and trailer hook. In the past angler supply sources have produced and made available to the public a wide variety of skirt designs, colors, textures and patterns which are marketed in bundles held together in a center section of the bundle by an elastomeric band. One commercial source of such ready make skirts is the Bass Pro Shops located in Springfield, Mo.

Alternatively an angler can make his/her own fishing lure skirts by purchasing tab sets which are composed of a thin silicone material approximately five inches in length and an inch or so in width with fused ends and a center portion slit into fine parallel tendrils of twenty two or so per tab set. Elastomeric tab sets are commercially available in a wide variety of solid colors, solid colors with glitter, tabs that enhance color when the sun is shining and others where the sun is not present, ones with vertical barbed wire looking strips, ones with stripes in a middle portion and spots at the ends, ones with color in the middle half and a different color at the ends, glitter on both sides, ones with fish scale patterns, ones with vertical glitter bars, ones with two or three different vertical colored stripes in a pattern (viz. brown, green, orange, chartreuse, and so on), ones with spots or fish scales in a chrome foil color. Sometimes bass skirt tabs have a combination of the above described features, even in one set of twenty two tendrils. Such fishing lure tendril tab sets are commercially available from a variety of supply houses, recreational fisherman catalogues, and online, at www.fishingskirts.com; www.barlowstackle.com; www.basspro.com; www.lurepartsonline.com; as examples, with literally hundreds of different skirt tab sets to choose form.

Although a wide variety of skirt body and tail tendril combination fishing lures are produced commercially, anglers often prefer to select and produce their own design combinations based on personal experience and perceived optimum bass preferences for a wide variety of environmental conditions. Skirt tab strips, however, are typically composed of thin flexible silicone tendrils of twenty two strands that are fused at each end into a single tab set that is relatively easy to handle. Individual pairs of fine tendril strips can be cut off of a single tab to make various combinations of tendrils, however, individual tendril pairs tend to be thin, flexible and a challenge to handle and form into an effective and desirable fishing lure skirt. As noted above, commercially produced fishing lure skirts are available but they lack the personalized aspect of a fishing lure that is an integral part of a satisfying angling experience. ("My spinnerbait lure with personalized body and/or tail tendrils is the best and was my personal design.")

Accordingly, it would be highly desirable to provide a kit and method of use for individual anglers to personalize their own skirt designs while using commercially available silicone, skirt tab sets where individual, thin, tendril pairs can be used to build up a varied and sophisticated skirt set for a personalized skit body, as well as a skirt body and tail combination, of color, glitter, pattern, density, etc. Such personalized skirts can then be operably joined with a spinnerbait or buzzbait body and hook, as an example, to produce a completed personalized lure.

Simple skirt production tools exist that function to produce a bundle of skirt tendrils simply held together by a central band, however, tools known in the past lack a desirable level of sophistication necessary to enable an individual angler to efficiently visualize and produce an effective fishing lure product. Even an angler with a substantial degree of experience often has trouble producing skirt sets for spinnerbait and buzzbait applications that enables optimum use of a variety of colored tendril strands, designs, textures, and lengths to make a skirt body of a fish lure covering a hook or a combination of a skirt body and tail design effective for a given fishing situation. In this, individual silicone tendril strips or fine silicone pairs are difficult to manually handle, maneuver and visually place in a pattern that emulates a bait fish with respect to color, texture, glitter, number of strands, etc. Still further, tail tendrils of a suitable length and design variety utilizing individual strand pairs from a wide variety of commercially available, silicone tab sets can be challenging and problematic to visualize and assemble.

Although producing an effective fishing lure is more a matter of preference, experience and intuition than science clear water colors that match what bass are eating is often effective. In lightly stained water adding some skirt strands of chartreuse is often a good option. In darker stained water mostly black and dark blue strands often produce good results. On sunny days use of a skirt with glitter can be effective while on a darker day solid colors often seem easier for fish to see, etc.

Creating a personalized optimum fish lure with a body skirt or a body skirt and tail combination, out of a huge universe of possibilities, can be a never ending quest. In certain respects creation of the perfect fish lure skirt for a particular environmental condition is a not insignificant part of a desirable angling experience.

The limitations and desires noted in the preceding are not intended to be exhaustive but rather are among many which may tend to reduce the effectiveness, reliability and angler satisfaction with producing personalized fishing lure skirt bodies and fishing lure skirt bodies with tails. Other noteworthy problems may also exist; however, those presented above should be sufficient to demonstrate that personalized production of fishing lures, with unique personalized skirt designs suitable to an individual angler's preferences, appearing in the past will admit to worthwhile improvement.

THE DRAWINGS

Numerous advantages of the present invention will become apparent from the following detailed description of preferred embodiments taken in conjunction with the accompanying drawings wherein:

FIGS. 3A-3T are images of kit components utilized to produce an angler's personalized skirt body of fine silicone tendrils and a skirt tail with elongated, streaming tendrils, according to one preferred embodiment of the subject invention wherein:

Figure 2:
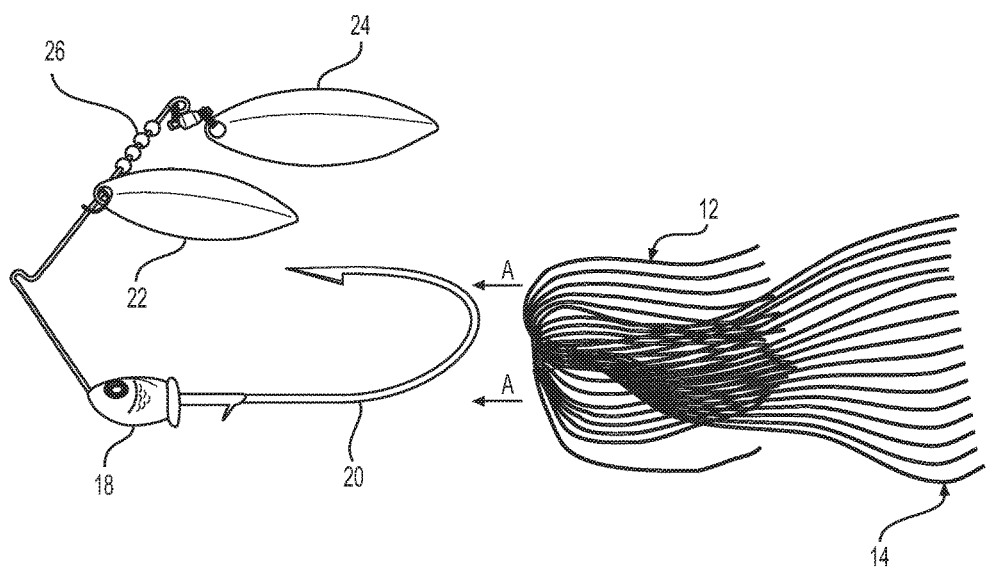
FIG. 2 is a view similar to FIG. 1 schematically showing a conceptual attachment of an angler personalized body skirt, with a tail, operable to be threaded onto a conventional spinnerbait hook set.
Figure 3A:
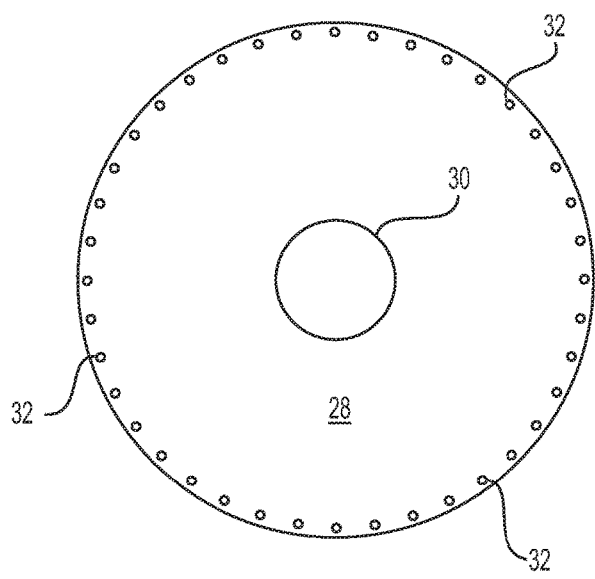
Figure 3B:
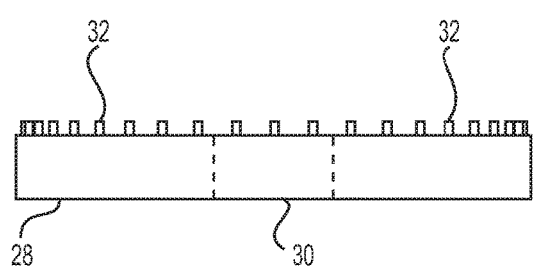
Figure 3C:
Figure 3D:
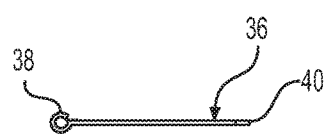
Figure 3E:
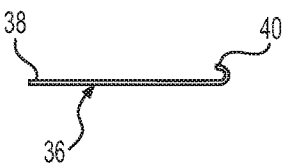
Figure 3F:
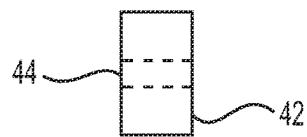
Figure 3G:
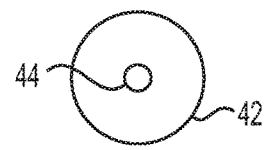
Figure 3H:
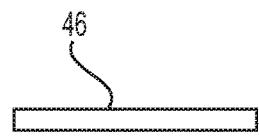
Figure 3I:
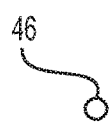
Figure 3J:
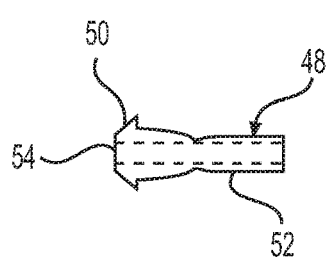
Figure 3K:
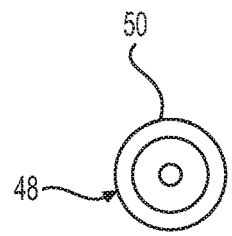
Figure 3L:
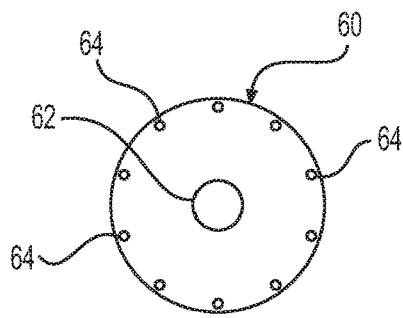
Figure 3M:
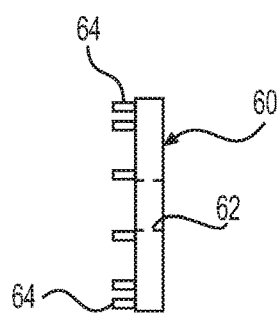
Figure 4A:
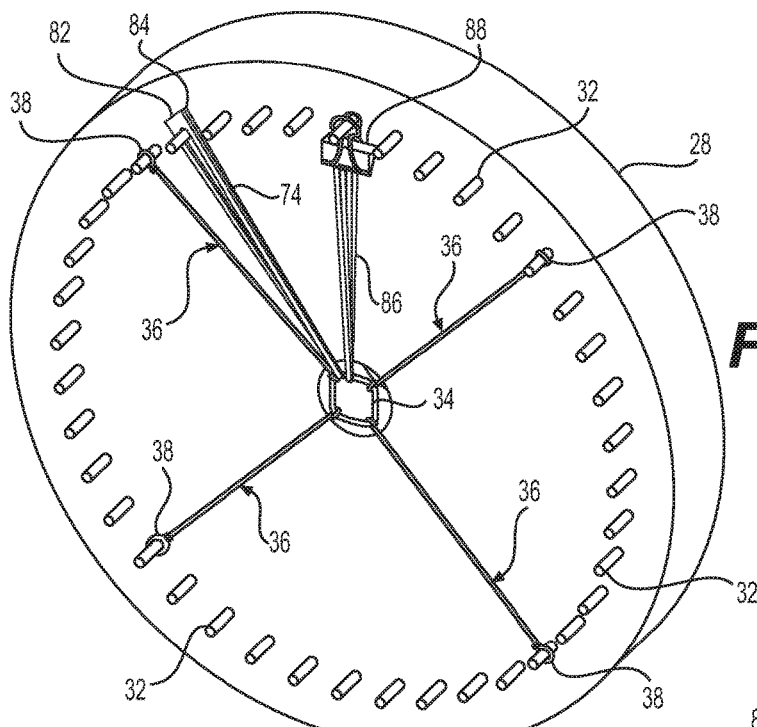
Figure 4B:
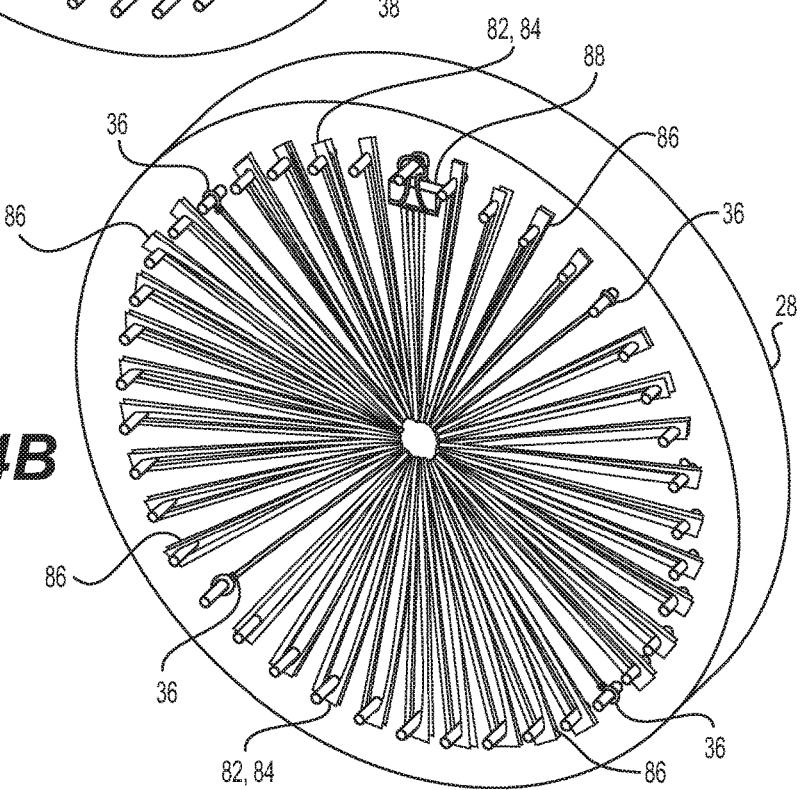
Figure 4C:
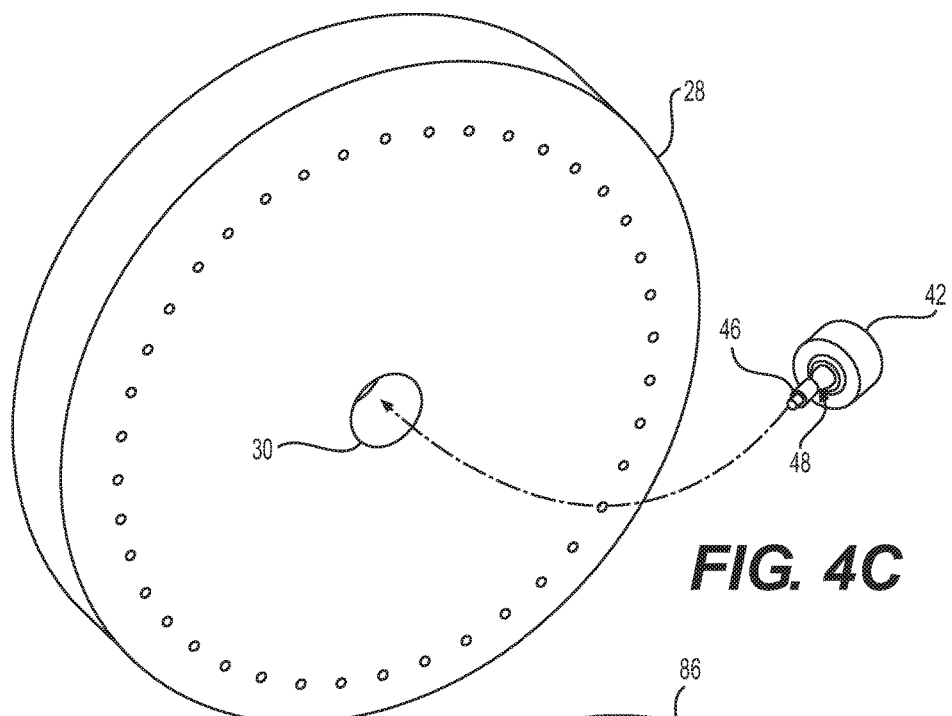
Figure 4D:
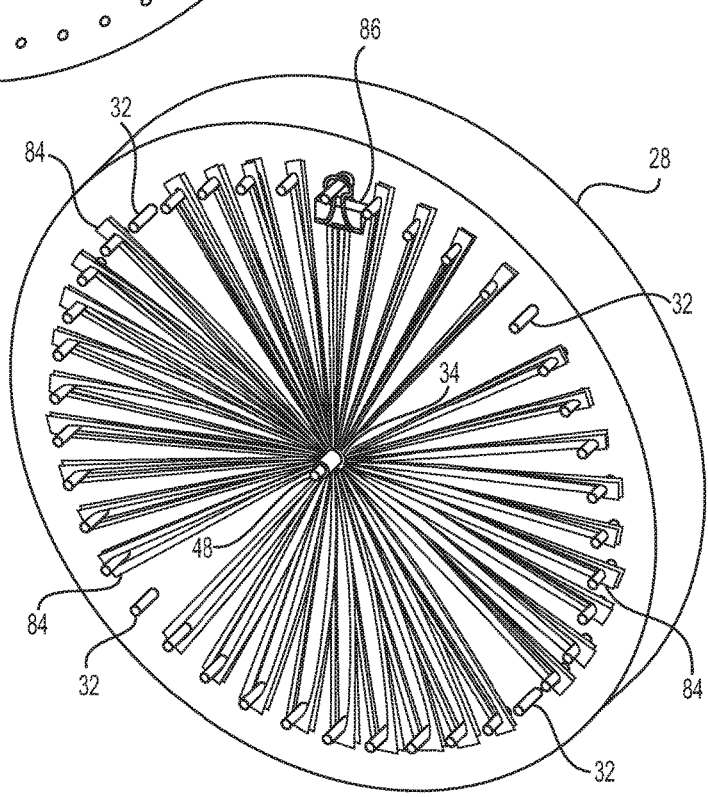
Figure 5A:
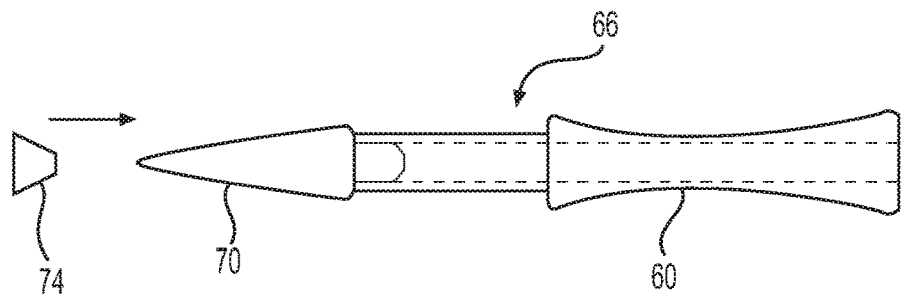
Figure 5B:
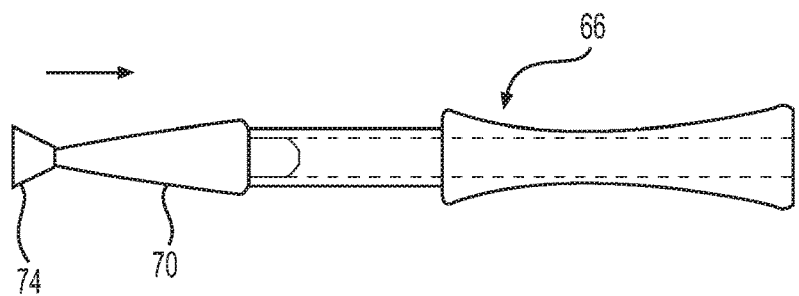
Figure 5C:
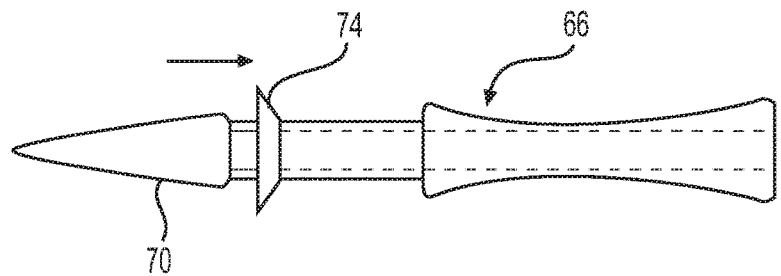
Figure 5D:
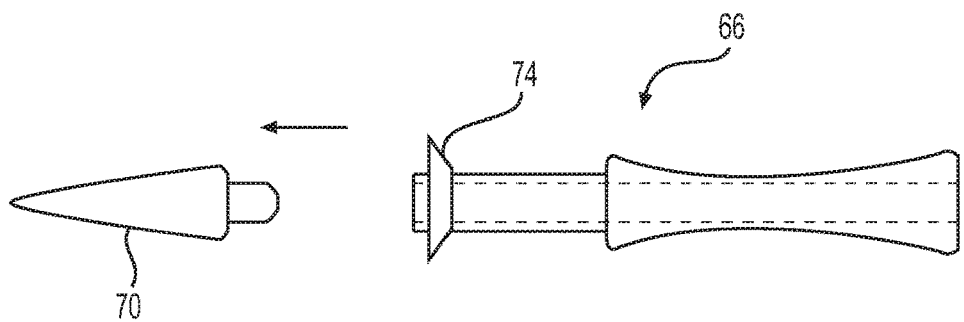
Figure 7A:
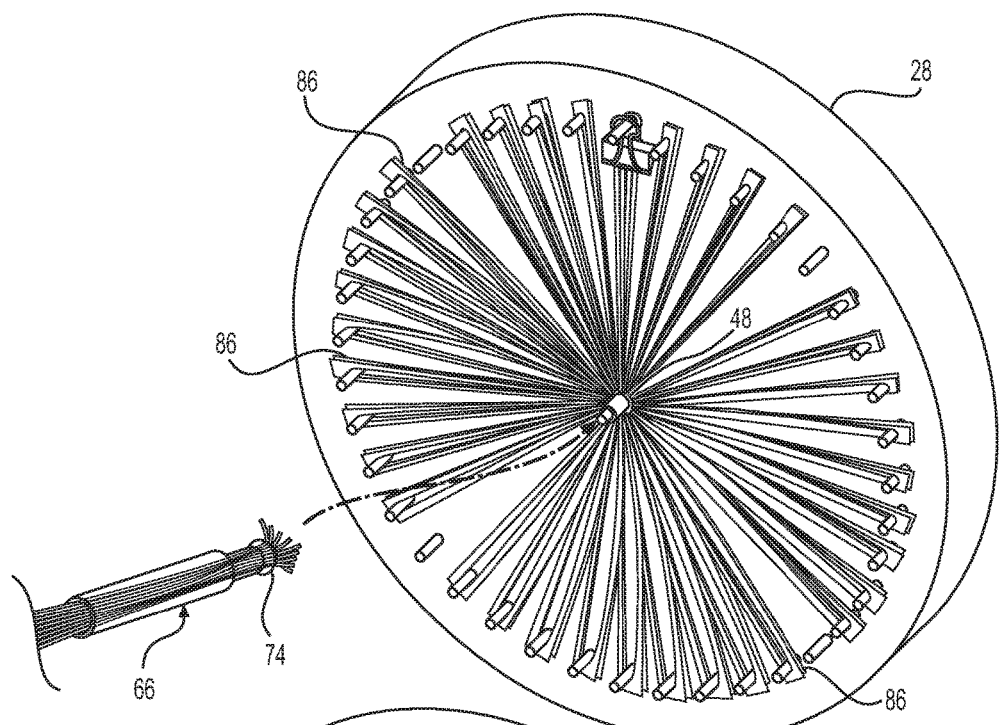
Figure 7B:
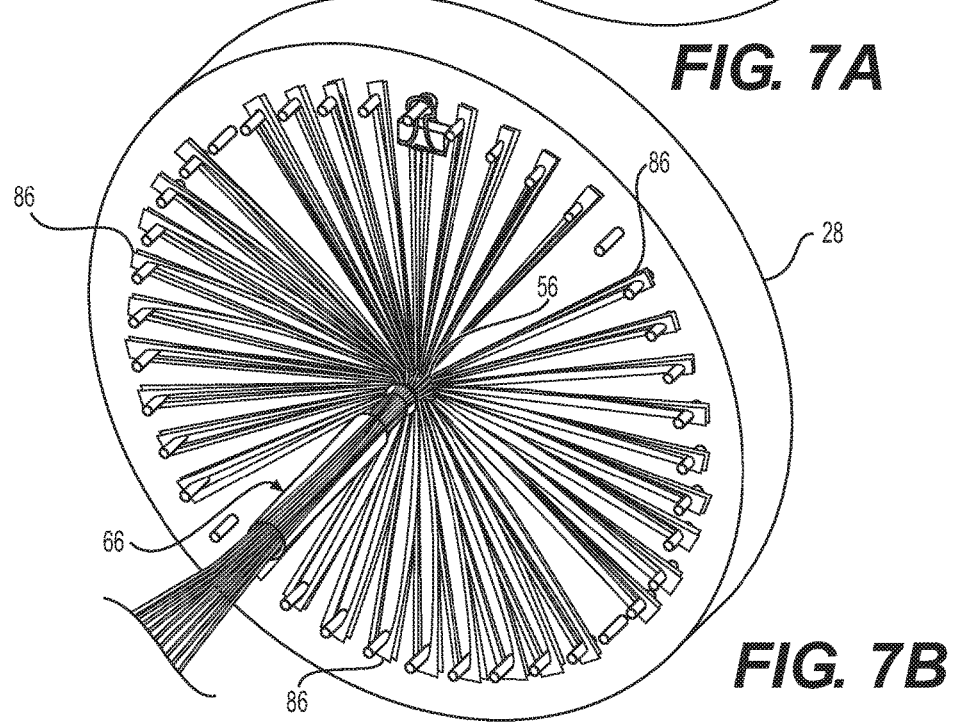
Figure 7C:
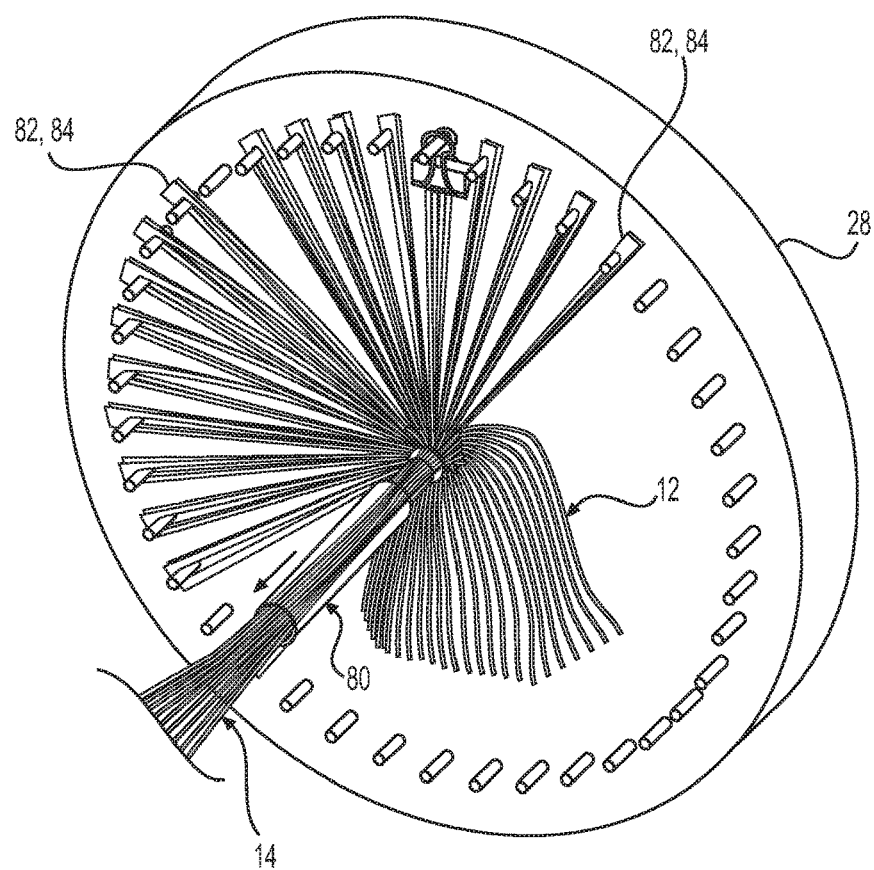
Figure 7D:
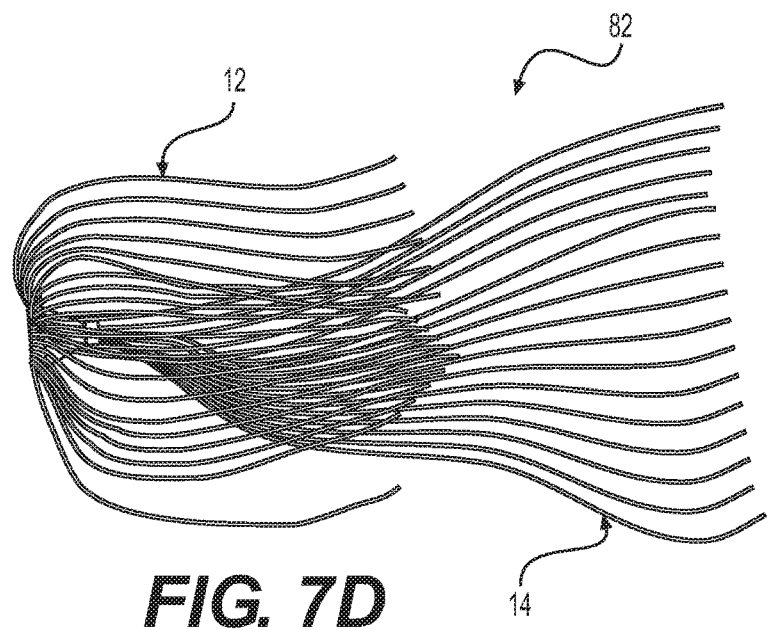

FIG. 3A is a plan view of a skirt body base member,
FIG. 3B is a side view of the skirt body base of FIG. 3A,
FIG. 3C is a plan view of an O-ring used to secure skirt body tendrils to a central hub member,
FIG. 3D is a plan view of hook member used to enlarge an O-ring at a central location of the skirt body base member shown in FIG. 3A,
FIG. 3E is a side view of the hook member illustrated in FIG. 3D, FIG. 3F is side view of a base member operable to secure a hub member in a central position of the skirt body base member illustrated in FIG. 3A,
FIG. 3G is an end view of the base member shown in FIG. 3F,
FIG. 3H is a side view of a removable column operable to be inserted into a central aperture through the base member illustrated in FIGS. 3F and 3G,
FIG. 3I is an end view of the column shown in FIG. 3H,
FIG. 3J is a side view of a fishing lure skirt hub operable to carry body and tail tendrils of a fishing lure,
FIG. 3K is an end view of the hub depicted in FIG. 3J,
FIG. 3L is a plan view of a disc member operable for forming elongated fishing lure tail tendrils,
FIG. 3M is a side view of the disc member illustrated in FIG. 3L,
FIG. 3N is a side view of a transparent, tubular member operable for attaching a set of tail tendrils to a hub member for a fishing lure,
FIG. 3O is an end view of the tubular member illustrated in FIG. 3N, viewed in the direction of arrow "B",
FIG. 3P is an image of solid cone member operable to be inserted into an open end of the tubular member illustrated in FIG. 3N, in the direction of arrow "B",
FIG. 3Q is a side view of a truncated cone retention member operable to be used to secure tail tendrils onto the hub shown in FIG. 3J,
FIG. 3R is an end view of the retention member illustrated in FIG. 3Q,
FIG. 3S is a plan view of a commercial tab set of twenty two fishing lure, fine, silicone tendrils that are fused together, and
FIG. 3T is a single pair of fine, fishing lure tendrils, with end junctions, that have been cut off of a commercial tab sent, such as shown in FIG. 3S;
FIG. 4A is an axonometric view of an initial step in an angler's personalized formation of a fishing lure, body skirt component, including use of a quadrant of central O-ring expansion hooks;
FIG. 4B is an axonometric view of a plurality of individual skirt strands formed around an attachment O-ring for a fishing lure, skirt body component;
FIG. 4C is a rear view of a fishing lure skirt forming disc depicted in FIGS. 4A-B showing insertion of a core member supported upon a stanchion mounted within a support cylinder for selective attachment to the lure skirt formation disc depicted in FIGS. 4A and 4B;
FIG. 4D is an axonometric, front view of the skirt formation disc of FIGS. 4A-C where O-ring expansion hooks have been removed and a central O-ring elastically clamps a plurality of fishing lure skirt, body tendrils onto a central skirt formation hub member;
FIG. 5A is a side of a transparent hand tool with an open cylindrical core operable to be used to produce an angler personalized fishing lure, tail tendrils with an elastomeric attachment ring having a truncated cone configuration in side view;
FIG. 5B is a side view similar to FIG. 5A disclosing sliding the elastomeric, truncated cone, tail attachment ring onto a cylindrical segment of the hand tool used to produce the fishing lure, elongated tail tendril component;
FIG. 5C is a side view similar to FIG. 5B with the truncated cone, elastomeric, attachment ring expanded and slid onto an outer surface of the cylindrical tail formation and inspection tool;

FIG. 5D discloses removal of the expansion cone following placement of the truncated cone, elastomeric, tail retention ring onto an outer surface of the tail component formation and inspection tool;

FIG. 6A is an axonometric view of a disc component of the subject fish lure formation kit used for an angler's personalized formation and visualization of elongated tail tendrils for a fishing lure;

FIG. 6B is an axonometric view of placement of a set of angler personalized tail tendrils into the inspection cylinder with an elastomeric mounting ring as depicted in FIGS. 5A-D;

FIG. 6C discloses removal of the tail tendril formation disc and positioning of the collection of tail tendrils within the transparent tail tendril inspection and collar mounting, cylindrical tool;

FIG. 7A is an axonometric view of a set of tail tendrils positioned within the transparent formation hand cylinder depicted in FIGS. 6A-C and advancement of the set of angler selected tail tendrils toward the central hub of the fishing lure skirt member;

FIG. 7B depicts positioning the tail tendrils onto a central tail formation hub member and pushing the truncated cone shaped elastomeric retaining ring over the end of the tail formation hub member for retaining the tail tendrils on the fishing lure hub member;

FIG. 7C discloses cutting the fish lure skirt body tendrils off of the formation disc and sliding the transparent tail inspection and formation cylinder off of the fishing lure tail tendrils; and FIG. 7D depicts a completed personalized fishing lure skirt body tendrils, with elongated tail tendrils, ready to be mounted onto a fish lure spinnerbait head and hook, such as, for example, illustrated in FIG. 2.

DETAILED DESCRIPTION

In this description the expression "approximately" or "generally" is intended to mean at or near but not always exactly such that an exact dimension or location is not considered critical in those contexts where those expressions appear. In this description focus will be directed to a kit of components used to produce a personalized fishing lure, such as, for example, spinnerbait or buzzbait with silicone body tendrils and elongated tail tendrils and a method of personalized production of fishing lure skirts. The size and order of kit components depicted in the drawings is intended to be one of illustration and example and not of limitation. The scope of the subject invention, rather, will be defined by the terms of the claims, as set forth below and operable equivalents thereof for performing the recited functions.

Figure 1:
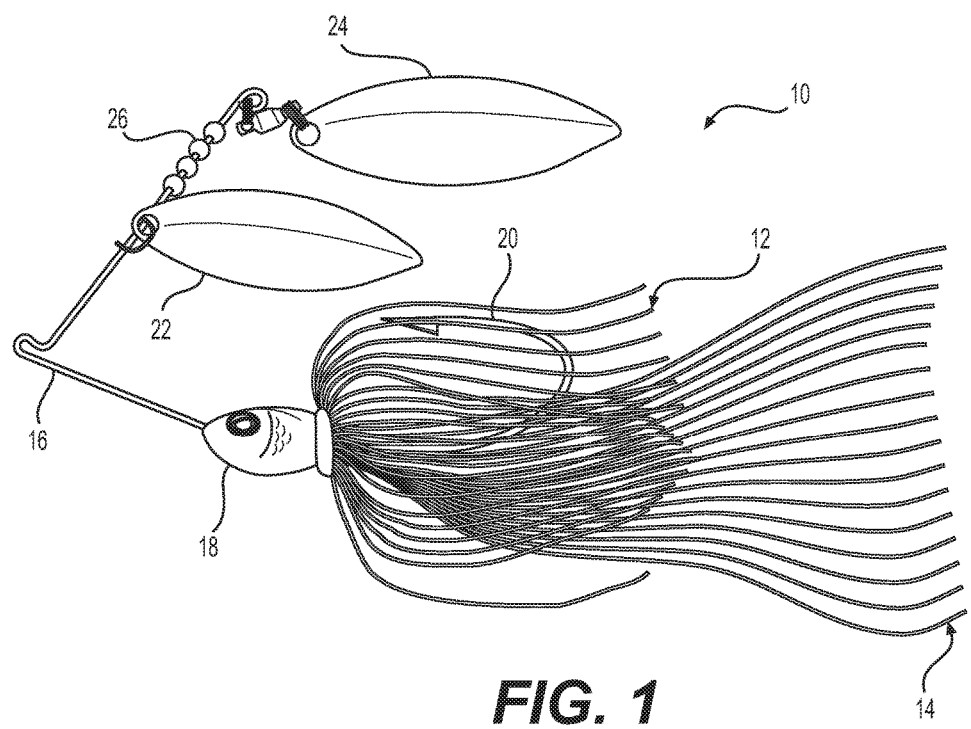
FIG. 1 is an axonometric view of a completed fish lure in accordance with one preferred embodiment of the invention including a body skirt, in combination with an extended skirt tail, as produced in accordance with the subject angler personalized skirt production kit.

Turning initially to FIG. 1 there is shown one example of a completed spinnerbait 10 made with a combination body skirt 12 and elongated tail skirt 14 in accordance with one embodiment the subject invention.

The spinnerbait 10 includes a conventional wire form 16 for attachment to an angler's line and on a lower end a baitfish head 18, such as shad, bluegill, etc., that terminates with a fish hook 20, such as, for example, a single bass hook. The other end of the spinnerbait includes a pair of conventional spinner willow blades 22 and 24 separated by a set of brass or nickel finish beads 26. In this construct the subject invention is directed to the personalized production of a fishing lure, body skirt 12 and a combination of a body skirt 12 in conjunction with an elongated, skirt tail 14.

Referring to FIG. 2 the spinnerbait conventional components 18-26 are shown on a left portion while the subject invention is directed to the fishing lure skirt body 12 and tail skirt 14 components. In this once an angler produces a personalized skirt set it is then added to the conventional components in the ultimate direction of arrows "A-A". This is accomplished by rotating the skirt set counterclockwise approximately 180 degrees and threading a central hub portion, to be described in detail later, over the hook 20 and finally seating the body and tail skirts against the bait head 18 in the completed posture depicted in FIG. 1.

FIG. 3, and component FIGS. 3A-T, feature a kit of components comprising one aspect of the subject invention. More particularly FIG. 3A discloses a plan view of a skirt body base member 28 that in one embodiment shown is in the shape of a disc with a central aperture 30 and a plurality of tendril anchor columns 32 positioned peripherally about the generally central aperture. Alternatively the disc could be in the form of a square member with a central aperture and a peripheral ring of anchor columns. FIG. 3B is a side view of the disc 28 depicting the fact that the tendril anchor columns 32 extend upwardly a relatively small amount that is sufficient to securely accept support of a plurality of O-ring expanding hook members and skirt body tendrils to be discussed below. The disc 28 and anchor columns 32 may be composed of wood, as an example, but are preferably formed from a molded plastic composition.

FIG. 3C discloses a conventional elastomeric O-ring 34 that functions in cooperation with a skirt hub member, to be discussed below, to secure skirt body tendrils 12 to the skirt hub. This combination is operable to form personalized skirt body tendrils for a fishing lure.

FIGS. 3D and 3E disclose plan and side views respectively of an O-ring hook member 36 having a loop head 38 at one end and a hook 40 at the other end and a shank portion that is dimensioned to radially extend and expand an O-ring 34 positioned centrally with respect to the skirt body base member.

FIGS. 3F and 3G disclose side and end views of a generally cylindrical hub base 42. The hub base is dimensioned to snuggly be received within the aperture 30 extending through the skirt body base member 28. The cylindrical hub base is fashioned with a central longitudinal aperture 44 that operably receives a hub holder column 46 shown in side view in FIG. 3H and an end view in FIG. 3I.

FIGS. 3J and 3K are a side view and an end view respectively of a fishing lure, skirt hub member 48. The skirt hub member 48 includes a head portion 50 and a generally cylindrical body member 52 with a central aperture 54 that is dimensioned to operably cooperate with the hub holder column 46 illustrated in FIGS. 3H and 3I.

FIG. 3L is a plan view of a skirt tail disc member 60 that is operable as a skirt tail formation and composition device. The disc member 60 includes a generally central aperture 62 that extends through the disc. As shown in FIG. 3M the disc member carries a plurality of columns that serve as mounting posts for an end of skirt tail tendril pairs in a manner which will be discussed below.

FIGS. 3N and 3O illustrate side and end views of a cylindrical hand tool 66 that includes a central aperture 68 and is, in a preferred embodiment, transparent. FIG. 3P is a conical head member 70 and cylindrical base 72 that is sized to be received in an end of the hand tool 66 in the direction of arrow "B." This conical head member 70 is used to expand the truncated elastomeric cone member 74 to enable the truncated cone member 74, with an axial aperture 76, to me mounted upon the cylindrical surface 52 of the fishing lure hub member 48.

FIGS. 3Q and 3R disclose an elastomeric truncated cone 74 having a central longitudinal aperture 76. This truncated cone 74 is composed of an elastomeric material and is dimensioned to expand and elastically extend over the cone 70 and onto cylindrical body member 66 for delivery to the fishing lure hub member 48.

FIG. 3S is a commercially available tab set 78 of fine, silicone tendrils 80 that are joined at each end 82 and 84. Tab sets of fishing lure tendrils are commercially available in a wide variety of colors, glitter, texture, patterns, designs, etc. Tab sets of the type used to form fishing lure skirts are commercially available from, for example, a catalog supply house known as Barlow's Tackle Shop located in Richardson, Tex. and online at www.barlowstackle.com.

Finally, FIG. 3T discloses a single tendril pair 86 that has been cut off of a tab set 78, such as illustrated in FIG. 3S, by longitudinally severing the end bands 82 and 84 to release a pair of silicon tendrils 86 from the set 78. An angler forming a personalized fishing lure skirt body and a skirt body with tail tendrils literally has hundreds of combination options by selecting individual skirt body and skirt tail pairs 86 cut from a variety of tab sets 78.

Turning now to FIGS. 4A through 4D there will be seen a sequence of axonometric views of the use of components of the subject skirt forming kit disclosed in FIGS. 3A-3K to form a fishing lure, skirt body 12. In this, FIG. 4A depicts the fishing lure, skit body, composition member 28 with its plurality of peripheral, tendril, securement columns 32. In FIG. 4A an O-ring 34 is shown connected to four hook members 36 that have loop head portions 38 releaseably connected to arbitrarily positioned but generally quadrant oriented securement columns 32 of the skirt body, composition member 28. Although four hook members 36 are depicted as a preferred arrangement to open and enlarge the O-ring 34 a minimum number of three hook members 36 would be operative. FIG. 4A also shows application of a skirt body tendril pair 84 looped through the enlarged O-ring 34 and connected at each end 80 and 82 to a securement column 32. Alternately the closed ends 80 and 82 of a tendril pair 84 can be releaseably attached to a securement column 32 by a conventional spring clip 88.

FIG. 4B depicts angler selection of a plurality of body tendril strips 84 that have been cut from tendril tab sets 76 that can vary in terms of color, pattern, texture, glitter, density, etc. The skirt body composition member 28 enables an angler to visualize the look of a base skirt and to advantageously alter and vary the composition of an ultimate skirt body tendril set 12 as necessary or desirable during the production process.

FIG. 4C discloses a back side of the skirt body, composition member 28. Once the pattern and density of the skirt body tendrils is established as illustrated in FIG. 4B the cylindrical hub base 42 and column 46, carrying hub 48, is inserted into aperture 30 from the back side. As illustrated in FIG. 4D the fishing lure hub member 48 will then project through the O-ring 34 and the quadrant of hook members 36 are released from securement columns 32 to enable the elastic O-ring 34 to resiliently clamp a central portion of each skirt body tendril 84 onto the cylindrical body member 52 of the skirt hub member 48.

FIGS. 5A-5D illustrate use of a skirt tail formation hand tool 66, that has a cylindrical in accordance with a preferred embodiment of the subject skirt forming kit. The hand tool is preferably transparent and used for the purpose of handling and mounting skirt tail tendrils 14 in a manner that will be discussed below.

As shown in FIG. 5A a truncated retention cone 74 is shown being axially advanced toward the hand tool 66 which has a conical head 70 designed to expand the elastomeric truncated retention cone 74. A central aperture 58 in the elastomeric, truncated cone, retention member 56 reaches the tip of the expansion cone 70 it expands outwardly as it is pushed along the cone tip 70 until it passes onto the end of transparent hand tool 66 as illustrated in FIG. 5C. At this point the conical tip 70 is axially removed as shown in FIG. 5D and the hand tool 66 is ready to receive skirt tail tendrils 14.

FIG. 6A discloses a fishing lure tail tendril base 60 in the form of a disc, note also FIG. 3, that includes a central aperture 62 and a plurality of peripheral, tail tendril, securement columns 64 (note again FIGS. 3L and 3M). In a preferred embodiment of the invention ten, tail tendril, columns 64 are provided about the central aperture 62 although a greater or lesser number of columns is within the ambit of the subject disclosure. This tail tendril base enables an angler an opportunity to assemble and visualize a finished tail tendril composition of fine elongate silicone tendrils before the tail is attached to a skirt body.

The entire length of a plurality of tail tendril pairs 86 are trained through the central aperture 62 of the fishing lure, tail tendril, base 60 and a closed end portion 82 of each tail tendril is fitted over a securement column 64. In this posture, as illustrated in FIGS. 6A and 6B, the composition of the skirt tail tendrils 86 can be visualized and inspected for a desired color, texture, length, glitter, etc. and changes can be facilely made as necessary or desirable in accordance with an individual angler's preference.

In FIG. 6C the transparent hand tool 66 is shown carrying a truncated cone, retention, elastic collar 74 and the fused end portions 82 and 84, of the bundle of tendrils 86, have been cut off.

FIG. 7A discloses the skirt body base 28 with a plurality of skirt body tendrils 86 mounted upon a central hub 48 as previously discussed in connection with FIG. 4D. The hand tool 66 carrying a bundle of tail tendrils 86 is used to insert a central portion of the tail tendrils 86 over the centrally located hub 48 and the truncated securement cone 74 is then pushed off of the end of the hand tool 66 onto the hub member 48. The elastomeric truncated securement cone 74 elastically binds the elongate tail tendrils 86 onto the hub member 48. This physical attachment can be enhanced by the application of a silicon glue or other adhesive composition to effectively secure the body and tail tendrils onto the central hub member.

Once the body and tail tendrils are secured to the hub the attachment ends 82, 84 of the pair of body tendrils are cut off and the hand tool 66 can be axially removed as illustrated in FIG. 7C to produce a compound skirt 82 having a plurality of skirt body tendrils 12 and elongated tail tendrils 14 as illustrated in FIG. 7D and as initially illustrated in FIGS. 1 and 2.

In describing the invention, reference has been made to preferred embodiments. Those skilled in the art however, and familiar with the disclosure of the subject invention, may recognize additions, deletions, substitutions, modifications and/or other changes which will fall within the scope of the invention as defined in the following claims. In the claims that follow the term "means" is sometimes used—followed by a functional statement. In those claims it is intended that the means clause will refer to the specific means or structure disclosed in the specification above and all structures that are operable to satisfy the recited function and it is not intended to be limited to just structural equivalents of the specific disclose illustrative embodiment(s).

What is claimed is:

1. An angler's personalized fishing lure skirt, composition and production kit comprising:
   a fishing lure, skirt body, composition member having a top surface and a bottom surface and an aperture extending through said composition member in a generally central posture from the top surface of said composition member to the bottom surface of said composition member;
   a plurality of fishing lure, skirt body, tendril securement columns extending outwardly from a top surface of said composition member and being positioned circumferentially about the aperture extending through said composition member and being operable to retain both ends of the skirt body tendrils;
   an elastomeric O-ring;
   a plurality of fishing lure skirt body, strip tendril pairs, each strip tendril of said strip tendril pairs extending generally in parallel and being joined together at both ends thereof;
   at least three hook members operable to engage the O-ring positioned generally co-axially with the aperture extending through said composition member and said hook members radiating outwardly to said tendril securement columns and being operable to stretch said O-ring into an enlarged posture positioned approximately co-axially with the central aperture through said composition member and wherein each pair of skirt body strip tendrils being operable to be looped through said outwardly stretched O-ring coaxially positioned with the composition member aperture and secured at the joined ends thereof to a securement column extending outwardly from a top surface of said composition member; and
   a fishing lure hub member operable to extend coaxially through the outwardly stretched O-ring and upon release of said O-ring from connection to said hook members said O-ring serving to securely bind a central portion of said fish lure body tendrils to an exterior surface of said fishing lure hub member to form a fish lure, skirt body about said fishing lure hub member.

2. An angler's personalized fishing lure skirt, composition and production kit as defined in claim 1 wherein said peripheral securement columns extending outwardly from said composition member comprises:
   approximately forty securement columns positioned peripherally about the aperture through said composition member and being generally mutually spaced to an equal degree with respect to each other about the aperture through said composition member.

3. An angler's personalized fishing lure skirt, composition and production kit as defined in claim 1 and further comprising:
   a generally cylindrical hub base, having a central aperture, and being operable to releaseably extend snuggly within the aperture extending through said composition member; and
   a hub holder column extending through the central aperture of said generally cylindrical hub base for engagement with a central aperture of said fishing lure hub member to hold said hub member generally coaxially with respect to said expanded O-ring.

4. An angler's personalized fishing lure skirt, composition and production kit as defined in claim 3 wherein:
   the axial length of said hub holder column is approximately equal to the thickness of said generally cylindrical hub base plus the length of said fishing lure hub member.

5. An angler's personalized fishing lure skirt, composition and production kit as defined in claim 1 and further comprising:
   means for production of fishing lure skirt tail tendrils having a length approximately twice the length of said fishing lure skirt body tendrils; and
   means to secure the fishing lure, skirt tail tendrils onto said fishing lure hub member such that said fishing lure skirt includes a body portion of skirt tendrils and a relative elongated set of fishing lure skirt tail tendrils.

6. An angler's personalized fishing lure skirt, composition and production kit as defined in claim 1 and further comprising:
   a fishing lure tail tendril base having a top surface and a bottom surface and an aperture extending through said fishing lure tail tendril base in a generally central posture from the top surface of the base to the bottom surface of the base; and
   a plurality of fishing lure skirt tail tendril securement columns extending outwardly from a top surface of said base and being positioned peripherally about the aperture extending through said base and being operable to retain one end of a plurality of fishing lure skirt tail tendril pairs for composition and inspection.

7. An angler's personalized fishing lure skirt, composition and production kit as defined in claim 6 wherein:
   approximately ten fishing lure skirt tail tendril securement columns extend peripherally about the aperture extending through said fishing lure tail tendril base.

8. An angler's personalized fishing lure skirt, composition and production kit as defined in claim 6 and further comprising:
   a cylindrical hand tool operable to longitudinally and interiorly receive a bundle of fishing lure skirt tail tendrils; and
   a conical insert member operable to be fitted onto one end of said cylindrical had tool to facilitate expansion of an elastic, truncated cone, skirt tail, tendril retainer having a central longitudinal aperture, said conical insert member being operable to radially expand the central longitudinal aperture of said elastic truncated cone, skirt tail, tendril retainer as it is pushed onto an exterior surface of one end of said cylindrical hand tool and wherein the transparent hand tool is operable to receive a bundle of fishing lure tail tendrils from said fishing lure tail base and to fit one end of the skirt tail tendrils over one end of said hub member and said elastic, truncated cone, skirt tail tendril retainer being operable to be translated axially off of said one end of said cylindrical hand tool and onto said hub member such that one end of the skirt tail tendrils of a visually known set of fishing skirt tail tendrils are securely retained onto an exterior surface of said hub member.

9. An angler's personalized fishing lure skirt, composition and production kit as defined in claim 6 and further comprising:
   a cylindrical hand tool operable to longitudinally and interiorly receive a bundle of fishing lure skirt tail tendrils; and
   a conical member operable to be fitted into one end of said cylindrical had tool to facilitate expansion of an elastic truncated cone, skirt tail, tendril retainer having a central longitudinal aperture, said conical insert member being operable to radially expand the central longitudinal aperture of said elastic truncated cone, skirt tail, tendril retainer as it is pushed onto an exterior surface of one end of said cylindrical hand tool.

10. An angler's personalized fishing lure skirt, composition and production kit as defined in claim 1 and further comprising:

a hook member being operable to extend through the hand tool to engage a free end of a joined pair of fishing lure tail tendrils to pull selective tail tendrils axially into said hand tool to make up a desired set of tail tendrils and to fit one end of the skirt tail tendrils over one end of said hub member and said elastic, truncated cone, skirt tail tendril retainer is operable to be translated axially off of said one end of said cylindrical hand tool onto said hub member such that one end of the skirt tail tendrils of a visually known set of fishing skirt tail tendrils are securely retained on an exterior surface of said hub member.

11. An angler's personalized fishing lure skirt, composition and production kit as defined in claim 10 wherein:

said cylindrical had tool is transparent in enable visual inspection of the color and texture of a set of fishing lure tail tendrils before attachment to said hub member.

12. An angler's personalized fishing lure skirt, composition and production kit comprising:

a plurality of fishing lure, strip tendril pairs, each strip tendril of said strip tendril pairs extending generally in parallel and being joined together at at least one end thereof;

means for selectively supporting and composing an assembly of desired skirt body fishing lure tendrils from said pairs of parallel tendrils;

at least one O-ring;

means for selectively enlarging said at least one O-ring to enable one end of said pairs of parallel body tendrils to be inserted into the center of said at least one O-ring to a central portion of said pairs of parallel body tendrils; and a fishing lure hub means operable to receive said pairs of fishing lure tendrils and said at least one O-ring which operably serves to securely bind a central portion of said fish lure body tendrils to an exterior surface of said fishing lure hub means to form a fish lure, skirt body about said fishing lure hub member.

13. An angler's personalized fishing lure skirt, composition and production kit as defined in claim 12 and further comprising:

means for production of fishing lure skirt tail tendrils having a length approximately twice the length of said fishing lure skirt body tendrils by using substantially the full length of each skirt tendril pairs to form the fishing lure skirt tail tendrils; and means to secure the fishing lure, skirt tail tendrils onto said fishing lure hub means such that said fishing lure skirt includes a body portion of skirt tendrils and a relative elongated set of fishing lure skirt tail tendrils.

14. An angler's personalized fishing lure skirt, composition and production kit as defined in claim 13 wherein:

said fishing lure body tendrils are approximately twice the length of said fishing lure body tendrils.

15. A method for an angler's personalized production of a fishing lure skirt comprising the steps of:

selecting a plurality of fishing lure body tendril pairs joined at each end of said tendril pairs;

positioning an elastic O-ring in a central portion of a fishing lure skirt composition member;

enlarging the elastic O-ring outwardly;

extending one end of each of said selected plurality of fishing lure body tendrils through the outwardly enlarged O-ring;

securing both ends of each of the tendril pairs in a posture radiating on the fishing lure skirt composition member outwardly from said enlarged O-ring;

positioning a fishing lure skirt hub member through a generally central position of the enlarged O-ring;

releasing the enlarged elastic O-ring; and using the released elastic O-ring, binding a generally central portion of the plurality of fishing lure skirt body tendrils to an exterior surface of the fishing lure skirt hub member to form a fishing lure body skirt upon the fishing lure hub member.

16. A method for an angler's personalized production of a fishing lure skirt as defined in claim 15 wherein said step of securing both ends of the tendril pairs comprises:

looping the ends of the tendril pairs around tendril securement columns positioned on the fishing lure skirt composition member.

17. A method for an angler's personalized production of a fishing lure skirt as defined in claim 15 wherein said step of enlarging the elastic O-ring comprises the steps of:

engaging at least three hook members onto the O-ring; and extending the at least three hook members onto securing engagement with the securement columns positioned on the fishing lure skirt composition member.

18. A method for an angler's personalized production of a fishing lure skirt as defined in claim 15 and further comprising the steps of:

forming fishing lure tail tendrils by securing one end of selected ones of fishing lure tail tendrils to a fishing lure tail formation member; and attaching the one end of the fishing lure tail tendrils to the fishing lure hub member in combination with the fishing lure body skirt tendrils.

19. A method for an angler's personalized production of a fishing lure skirt as defined in claim 15 and further comprising the steps of:

forming fishing lure tail tendrils by pulling one end of selected ones of fishing lure tail tendrils with a hook through a central portion of a cylindrical hand tool; and attaching the one end of the fishing lure tail tendrils to the fishing lure hub member in combination with the fishing lure body skirt tendrils.

20. A method for an angler's personalized production of a fishing lure skirt as defined in claim 18 or 19 wherein said steps of attaching comprises the step of:

positioning an elastic truncated cone about one end of the tail tendrils to bind the tail tendrils to the fishing lure hub member.

* * * * *